US012597858B2

(12) United States Patent
Zelig et al.

(10) Patent No.: US 12,597,858 B2
(45) Date of Patent: Apr. 7, 2026

(54) CONTROL OF A DC-DC CONVERTER TO SUPPLY A CONSTANT CURRENT TO A PULSED LOAD

(71) Applicant: Elta Systems Ltd., Ashdod (IL)

(72) Inventors: Robert Zelig, Ashdod (IL); David Nissimpoor, Ashkelon (IL)

(73) Assignee: Elta Systems Ltd., Ashdod (IL)

( * ) Notice: Subject to any disclaimer, the term of this patent is extended or adjusted under 35 U.S.C. 154(b) by 357 days.

(21) Appl. No.: 18/197,401

(22) Filed: May 15, 2023

(65) Prior Publication Data

US 2023/0369976 A1 Nov. 16, 2023

(30) Foreign Application Priority Data

May 16, 2022 (IL) .......................................... 293057

(51) Int. Cl.
*H02M 3/158* (2006.01)
*H02M 1/00* (2006.01)

(52) U.S. Cl.
CPC ......... *H02M 3/158* (2013.01); *H02M 1/0003* (2021.05)

(58) Field of Classification Search
CPC ......... H02M 3/33538; H02M 3/33546; H02M 3/33515; H02M 3/33576; H02M 3/33553;
(Continued)

(56) References Cited

U.S. PATENT DOCUMENTS 8,878,505 B2 11/2014 Temkin
10,056,830 B2 8/2018 Hu et al.
(Continued)

OTHER PUBLICATIONS

Capel A et al: "Large Signal Feedback Control and High Sampling Frequency Combine for an Efficient Radar Power Supply for Space Applications", Proceedings of the Annual Power Electronics Specialists Conference. (PESC). San Antonio, Jun. 11-14, 1990; [Proceedings of the Annual Power Electronics Specialists Conference. (PESC)], New York, IEEE, US, vol. 2, Jun. 11, 1990 (Jun. 11, 1990), pp. 839-846, XP000170350.

*Primary Examiner* — Bryan R Perez
(74) *Attorney, Agent, or Firm* — The Roy Gross Law Firm, LLC; Roy D. Gross

(57) ABSTRACT

There are provided systems and methods comprising, for a power supply which has an output electrically coupled to at least one pulsed load, generating a signal $V_{OV}$ informative of a voltage $V_{OUT}$ at the output of the power supply, generating a signal $V_{I_{load}}$ informative of a current $I_{load}$ required by the at least one pulsed load, wherein, for at least one given period of time, the current $I_{load}$ comprises a series of pulses, generating a signal $V_{I_{in}}$ informative of a current $I_{in}$ at an input of the power supply, feeding the signal $V_{OV}$, the signal $V_{I_{load}}$ and the signal $V_{I_{in}}$ to a controller of the power supply, and controlling, by the controller, the current $I_{in}$ such that the signal $V_{I_{in}}$ which is informative thereof, meets a predefined relationship with the signals $V_{OV}$ and $V_{I_{load}}$.

20 Claims, 9 Drawing Sheets

(58) Field of Classification Search
CPC ......... H02M 3/33507; H02M 3/33592; H02M 3/33523; H02M 3/3353; H02M 3/33569
See application file for complete search history.

(56) References Cited

U.S. PATENT DOCUMENTS

| | | | | |
|---|---|---|---|---|
| 10,218,264 | B1* | 2/2019 | Mcginty | H02M 1/15 |
| 10,298,122 | B2 | 5/2019 | Janehag et al. | |
| 2011/0006969 | A1 | 1/2011 | Batikoff | |
| 2018/0120877 | A1* | 5/2018 | Zhao | H02M 1/14 |
| 2019/0245525 | A1* | 8/2019 | Kanesaki | H03K 3/353 |

* cited by examiner

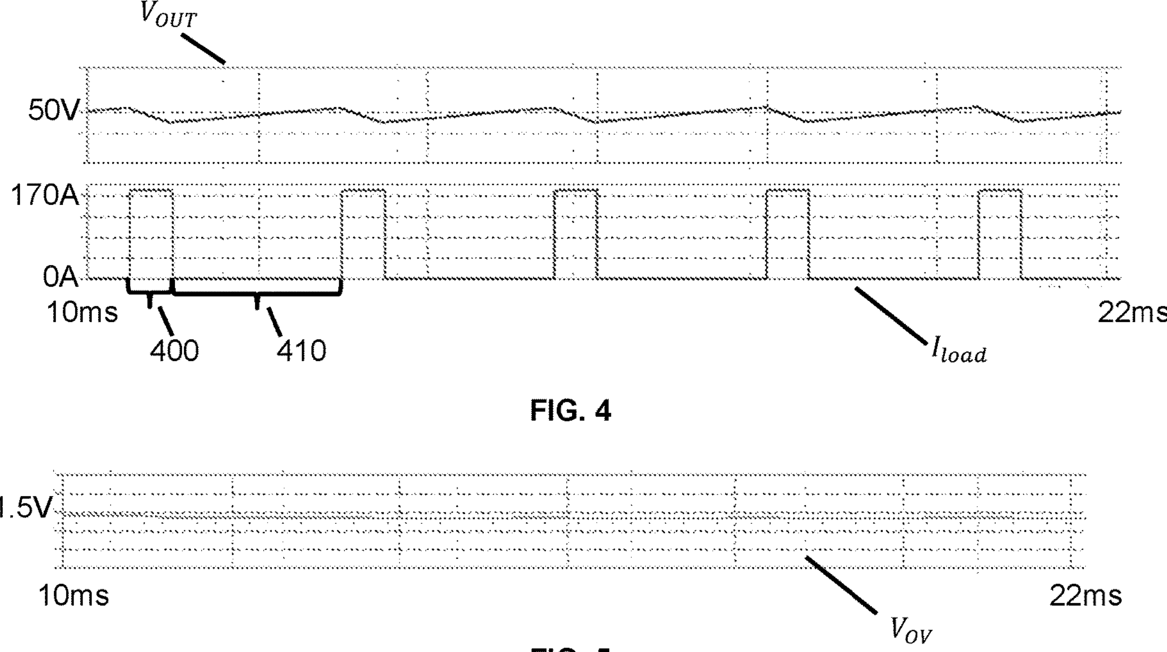
FIG. 4
1.5V
10ms
22ms
$V_{OV}$
FIG. 5
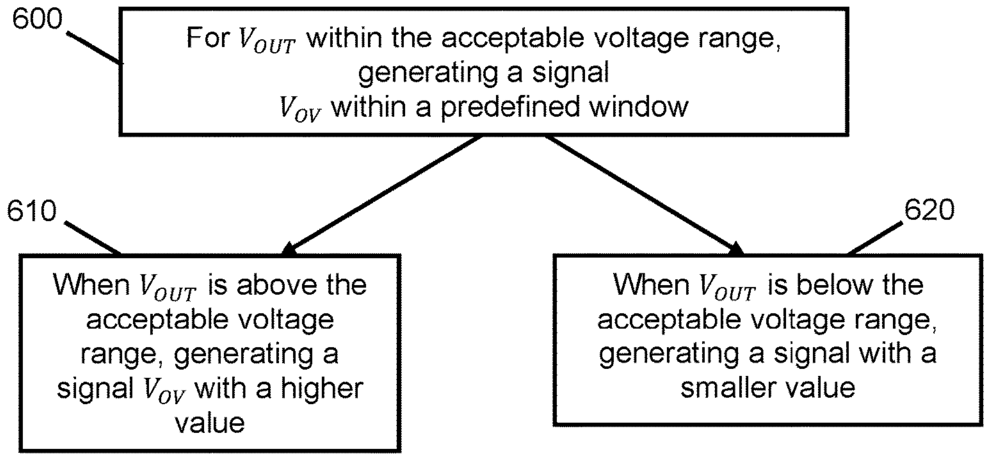
FIG. 6

CONTROL OF A DC-DC CONVERTER TO SUPPLY A CONSTANT CURRENT TO A PULSED LOAD

PRIORITY

The patent application claims priority of IL293057, filed on May 16, 2022.

TECHNOLOGICAL FIELD

The invention is in the field of control of a power supply coupled to a pulsed load.

BACKGROUND

A pulsed load or switched load is a load which requires a large supply of power intermittently.

A power supply (such as a DC-DC converter) provides energy to the pulsed load. In order to mitigate the impact of the pulsating requirement of the pulsed load on the power supply, some prior art solutions use a plurality of intermediate converters (multi-stage converters) and heavy filters. These solutions are costly and not optimal in terms of efficiency.

References considered to be relevant as background to the presently disclosed subject matter are listed below (acknowledgement of the references herein is not to be inferred as meaning that these are in any way relevant to the patentability of the presently disclosed subject matter):

U.S. Ser. No. 10/218,264;

U.S. Pat. No. 8,878,505;

U.S. Ser. No. 10/298,122; and

U.S. Ser. No. 10/056,830.

There is therefore a need to propose new systems and methods to control a power supply coupled to a pulsed load.

GENERAL DESCRIPTION

In accordance with certain aspects of the presently disclosed subject matter, there is provided a method comprising, for a power supply which has an output electrically coupled to at least one pulsed load: generating a signal $V_{OV}$ informative of a voltage $V_{OUT}$ at the output of the power supply, generating a signal $V_{I_{load}}$ informative of a current $I_{load}$ required by the at least one pulsed load, wherein, for at least one given period of time, the current $I_{load}$ comprises a series of pulses, generating a signal $V_{I_{in}}$ informative of a current $I_{in}$ at an input of the power supply, feeding the signal $V_{OV}$, the signal $V_{I_{load}}$ and the signal $V_{I_{in}}$ to a controller of the power supply, and controlling, by the controller, the current $I_{in}$ such that the signal $V_{I_{in}}$ which is informative thereof, meets a predefined relationship with the signals $V_{OV}$ and $V_{I_{load}}$.

In addition to the above features, the method according to this aspect of the presently disclosed subject matter can optionally comprise one or more of features (i) to (xviii) below, in any technically possible combination or permutation:

i. the amplitude of $I_{in}$ is constant according to a stability criterion over at least part of the given period of time;

ii. said controlling of the current $I_{in}$ by the controller according to the predefined relationship induces the power supply to generate, at its output, a current $I_{out}$ which matches an average of $I_{load}$ according to a matching criterion over at least part of the given period of time;

iii. the current $I_{out}$ is constant according to a stability criterion over at least part of the given period of time;

iv. the voltage $V_{OUT}$ is associated with an acceptable voltage range comprising a minimal acceptable value $V_{OUT,min}$ and a maximal acceptable value $V_{OUT,max}$, wherein the signal $V_{OV}$ is informative of whether the voltage $V_{OUT}$ is within the acceptable voltage range;

v. the voltage $V_{OUT}$ is within the acceptable voltage range, the signal $V_{OV}$ remains within a different voltage range between a first value $V_{OV,1}$ and a second value $V_{OV,2}$;

vi. the second value $V_{OV,2}$ is determined for a maximal average current $I_{load}$ required by the pulsed load during given conditions of operation, such that, according to said predefined relationship, $V_{I_{in}}=V_{I_{load}}$;

vii. when the voltage $V_{OUT}$ is above the maximal acceptable value $V_{OUT,max}$, the signal $V_{OV}$ is set equal to a first maximal value $V_{OV,max}$, larger than $V_{OV,2}$;

viii. the output of the power supply is electrically coupled to an output capacitor, wherein when an average value of the current $I_{load}$ is increased, an amplitude of discharge of the output capacitor during a pulse of $I_{load}$ is increased, and the signal $V_{OV}$ is decreased;

ix. the output of the power supply is electrically coupled to an output capacitor, wherein when an average value of the current $I_{load}$ is decreased, an amplitude of discharge of the output capacitor during a pulse of $I_{load}$ is decreased, and the signal $V_{OV}$ is increased;

x. the output of the power supply is electrically coupled to an output capacitor, wherein during periods of the given period of time in which $I_{load}$ does not comprise pulses, $I_{out}$ enables charging of the output capacitor;

xi. the current $I_{out}$ which is used to charge the output capacitor, is constant according to a stability criterion over at least part of the given period of time;

xii. the output of the power supply is electrically coupled to an output capacitor, wherein, during at least one period of the given period of time in which a pulse of current $I_{load}$ is required by the pulsed load, the power supply generates a current $I_{out}$ and the output capacitor generates a current $I_{capacitor}$, wherein the sum of $I_{out}$ and $I_{capacitor}$ matches an amplitude of the pulse of current $I_{load}$ required by the pulsed load according to a matching criterion;

xiii. an input voltage provided to the power supply is down-converted only once before it is fed, at the output of the power supply, to the pulsed load;

xiv. the controller induces a decrease of an amplitude of $I_{in}$ when an amplitude of $V_{OV}$ increases;

xv. the controller induces an increase of an amplitude of $I_{in}$ when an amplitude of $V_{OV}$ decreases;

xvi. the controller induces an increase of an amplitude of $I_{in}$ when an amplitude of $V_{I_{load}}$ increases;

xvii. the controller induces a decrease of an amplitude of $I_{in}$ when an amplitude of $V_{I_{load}}$ decreases; and xviii. the controller controls $I_{in}$ using the predefined relationship $k_1V_{I_{in}}+k_2V_{OV}-k_3V_{I_{load}}=V_{ref}$, wherein $k_1$, $k_2$, and $k_3$ are positive parameters, and $V_{ref}$ is a reference voltage of the controller.

In accordance with certain aspects of the presently disclosed subject matter, there is provided a system comprising a controller operative to control a power supply which has an output electrically coupled to at least one pulsed load, wherein the controller is operative to obtain a signal $V_{OV}$ informative of a voltage $V_{OUT}$ at the output of the power supply, obtain a signal $V_{I_{load}}$ informative of a current $I_{load}$ required by the at least one pulsed load, wherein, for at least one given period of time, the current $I_{load}$ comprises a series of pulses, obtain a signal $V_{I_{in}}$ informative of a current $I_{in}$ at an input of the power supply, and control the current $I_{in}$ such that the signal $V_{I_{in}}$ which is informative thereof, meets a predefined relationship with the signals $V_{OV}$ and $V_{I_{load}}$.

In addition to the above features, the system according to this aspect of the presently disclosed subject matter can optionally comprise one or more of features (xix) to (xxxviii) below, in any technically possible combination or permutation:

xix. the amplitude of $I_{in}$ is constant according to a stability criterion over at least part of the given period of time;

xx. said control of the current $I_{in}$ by the controller according to said predefined relationship induces the power supply to generate, at its output, a current $I_{out}$ which matches an average of $I_{load}$ according to a matching criterion over at least part of the given period of time;

xxi. the current $I_{out}$ is constant according to a stability criterion over at least part of the given period of time.

xxii. the voltage $V_{OUT}$ is associated with an acceptable voltage range comprising a minimal acceptable value $V_{OUT,min}$ and a maximal acceptable value $V_{OUT,max}$, wherein the signal $V_{OV}$ is informative of whether the voltage $V_{OUT}$ is within the acceptable voltage range;

xxiii. the voltage $V_{OUT}$ is within the acceptable voltage range, the signal $V_{OV}$ remains within a different voltage range between a first value $V_{OV,1}$ and a second value $V_{OV,2}$.

xxiv. the second value $V_{OV,2}$ is determined for a maximal average current $I_{load}$ required by the pulsed load during given conditions of operation, such that, according to said predefined relationship, $V_{I_{in}}=V_{I_{load}}$;

xxv. when the voltage $V_{OUT}$ is above the maximal acceptable value $V_{OUT,max}$, the signal $V_{OV}$ is set equal to a first maximal value $V_{OV,max}$, larger than $V_{OV,2}$;

xxvi. the system comprises an output capacitor electrically coupled to the output of the power supply, wherein when an average value of the current $I_{load}$ is increased, an amplitude of discharge of the output capacitor during a pulse of $I_{load}$ is increased, and the signal $V_{OV}$ is decreased;

xxvii. the system comprises an output capacitor electrically coupled to the output of the power supply, wherein when an average value of the current $I_{load}$ is decreased, an amplitude of discharge of the output capacitor during a pulse of $I_{load}$ is decreased, and the signal $V_{OV}$ is increased;

xxviii. the system comprises an output capacitor electrically coupled to the output of the power supply, wherein during periods of the given period of time in which $I_{load}$ does not comprise pulses, $I_{out}$ enables charging of the output capacitor;

xxix. the current $I_{out}$ which is used to charge the output capacitor, is constant according to a stability criterion over at least part of the given period of time;

xxx. the system comprises an output capacitor electrically coupled to the output of the power supply, wherein, during at least one period of the given period of time in which a pulse of current $I_{load}$ is required by the pulsed load, the power supply is operative to generate a current $I_{out}$ and the output capacitor is operative to generate a current $I_{capacitor}$, wherein the sum of $I_{out}$ and $I_{capacitor}$ matches an amplitude of the pulse of current $I_{load}$ required by the pulsed load according to a matching criterion;

xxxi. an input voltage provided to the power supply is down-converted only once before it is fed, at the output of the power supply, to the pulsed load;

xxxii. the controller is operative to induce a decrease of an amplitude of $I_{in}$ when an amplitude of $V_{OV}$ increases;

xxxiii. the controller is operative to induce an increase of an amplitude of $I_{in}$ when an amplitude of $V_{OV}$ decreases;

xxxiv. the controller is operative to induce an increase of an amplitude of $I_{in}$ when an amplitude of $V_{I_{load}}$ increases;

xxxv. the controller is operative to induce a decrease of an amplitude of $I_{in}$ when an amplitude of $V_{load}$ decreases.

xxxvi. the controller is operative to control $I_{in}$ using the predefined relationship $k_1V_{I_{in}}+k_2V_{OV}-k_3V_{I_{load}}=V_{ref}$, wherein $k_1$, $k_2$, and $k_3$ are positive parameters, and $V_{ref}$ is a reference voltage of the controller;

xxxvii. the system comprises the power supply; and xxxviii. the system comprises the pulsed load.

According to some embodiments, the proposed solution provides control and architecture of a power supply connected to a pulsed load which enables high efficiency operation of the power supply.

According to some embodiments, the proposed solution provides a highly efficient power supply together with a reduction of the manufacturing costs.

According to some embodiments, the proposed solution prevents the pulsating requirement of a pulsed load from significantly impacting operation of the power supply.

According to some embodiments, the proposed solution enables usage of a single stage DC-DC converter to provide energy to a pulsed load.

According to some embodiments, the proposed solution does not require the use of heavy filters.

According to some embodiments, the proposed solution induces smooth behavior of the power supply, notwithstanding the pulsating requirement of the pulsed load.

According to some embodiments, the proposed solution provides efficient control of the power supply, even in the presence of high-frequency pulsed load(s).

According to some embodiments, the proposed solution provides control of the power supply which adapts quickly to changes in the load required by the pulsed load(s).

According to some embodiments, the proposed solution reduces the need for cooling of the system.

According to some embodiments, the proposed solution reduces the weight of the system.

According to some embodiments, the proposed solution proposes a system which is more reliable.

According to some embodiments, the proposed solution increases the MTBF ("Mean Time Between Failures") of the system.

According to some embodiments, the proposed solution is operative even with high-voltage pulsed load.

According to some embodiments, the proposed solution provides a power supply with a low RMS current at its output ($I_{out}$).

According to some embodiments, the proposed solution does not require usage of a filter at the input of the power supply.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4 illustrates a non-limitative example of a voltage at the output of the power supply coupled to the pulsed load, and of a current required by the pulsed load;

FIG. 5 illustrates a non-limitative example of a voltage signal informative of the voltage at the output of the power supply;

FIG. 6 illustrates an embodiment of a conversion of the voltage at the output of the power supply into a voltage signal informative thereof;

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Figure 1A:
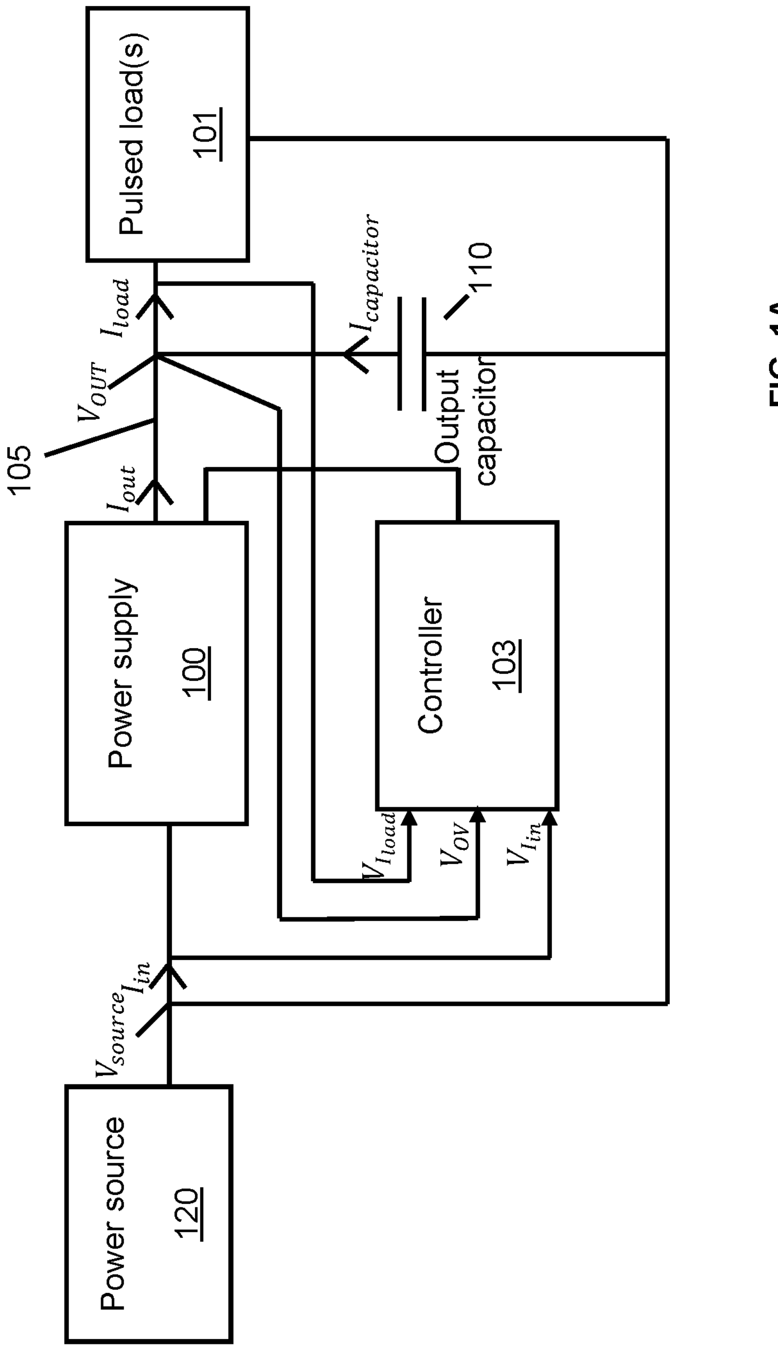
FIG. 1A illustrates an architecture of a system operative to provide energy to a pulsed load.

Attention is drawn to FIG. 1A, which illustrates a controlled power supply 100 electrically coupled to a pulsed load 101.

The power supply 100 is typically a DC/DC converter. For example, it can be a Buck Converter or a Boost Converter. According to some embodiments, the architecture as described in FIG. 1A (or in the other embodiments described hereinafter) enables to feed energy to the pulsed load 101 using a single power supply 100 (e.g., single DC/DC converter, or single Buck Converter, or single Boost converter). This corresponds to a "single stage" converter. In a single stage converter, the input voltage (see $V_{source}$ in FIG. 1) provided to the power supply is down-converted only once (it is reduced to a lower voltage only once) before it is fed, at the output of the power supply (see $V_{OUT}$), to the pulsed load 101. The down-conversion is performed by the power supply 100.

The pulsed load 101 can include a single pulsed load, or a plurality of pulsed loads (in some embodiments, the plurality of pulsed loads can operate synchronously in time). Non-limitative examples of pulsed loads include e.g., a phased-array antenna (including a plurality of tiles), a radar, or other pulsed load applications.

The output 105 of the controlled power supply 100 is electrically coupled (connected) to the pulsed load 101 and to an output capacitor 110. The output capacitor 110 is itself electrically coupled to the pulsed load 101.

The power supply 100 receives energy from a power source (voltage source) 120. In some embodiments, the power source 120 includes a rectified phase of a 3-phase power line having a rectified line voltage. In some embodiments, the power source 120 includes an electrically connected bank of batteries configured to provide a required line voltage. This is however not limitative. The voltage provided by the power source 120 to the power supply 100 is noted $V_{source}$. $V_{source}$—which is generally a constant voltage (e.g., 320 V—this is however not limitative), and is a given input imposed by the electrical network.

FIG. 1A further illustrates a controller 103, which controls operation of the power supply 100. The controller 103 can be a Pulse Width Modulation (PWM) controller. This is however not limitative. Various signals are generated and fed to the input of the controller 103, which will be discussed hereinafter.

Figure 1B:
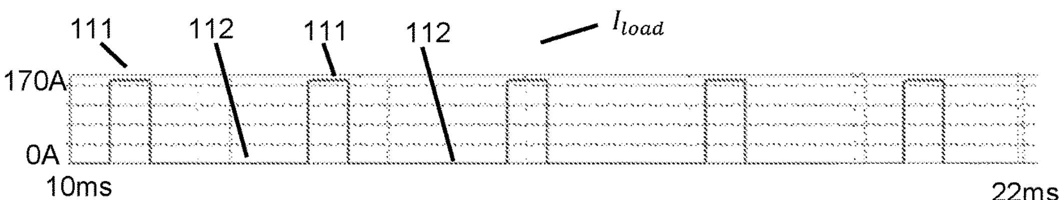
FIG. 1B illustrates a non-limitative example of a current required by a pulsed load, which includes pulses of current.

Attention is now drawn to FIG. 1B.

FIG. 1B depicts a non-limitative example of the current $I_{load}$, which is required by the pulsed load 101 for its operation over a given period of time (between 10 ms and 22 ms—the period of time between 0 ms and 10 ms can correspond e.g., to a transition period).

As visible in FIG. 1B, current $I_{load}$ includes a series of pulses (also called bursts). Note that the representation of FIG. 1B, in which a perfect square signal is depicted, is schematic, and the pulses of the current $I_{load}$ may include a slope (caused by a non-zero rise time). The profile of $I_{load}$ in the period of time represented in FIG. 1B corresponds to an alternance over time between:

- pulses 111 of current intensity, and
- periods of time which are free of pulses, in which the current intensity 112 is equal to zero (or nearly equal to zero).

According to some embodiments, the different pulses of the current intensity $I_{load}$ are, at least during a given time frame, of the same amplitude (or substantially of the same amplitude). In the non-limitative example depicted in FIG. 1B, the amplitude of each of the pulses is equal to 170 A in a time frame between 10 ms and 22 ms.

In the non-limitative example of FIG. 1B, the duty cycle of the current intensity $I_{load}$ is equal to 20% (this value is not limitative). The duty cycle corresponds to the ratio between the duration of the pulses and the total period of the waveform.

In the non-limitative example of FIG. 1B, the current intensity $I_{load}$ has a frequency of 400 Hz (each pulse having a duration/width of 500 μs).

Figure 1C:
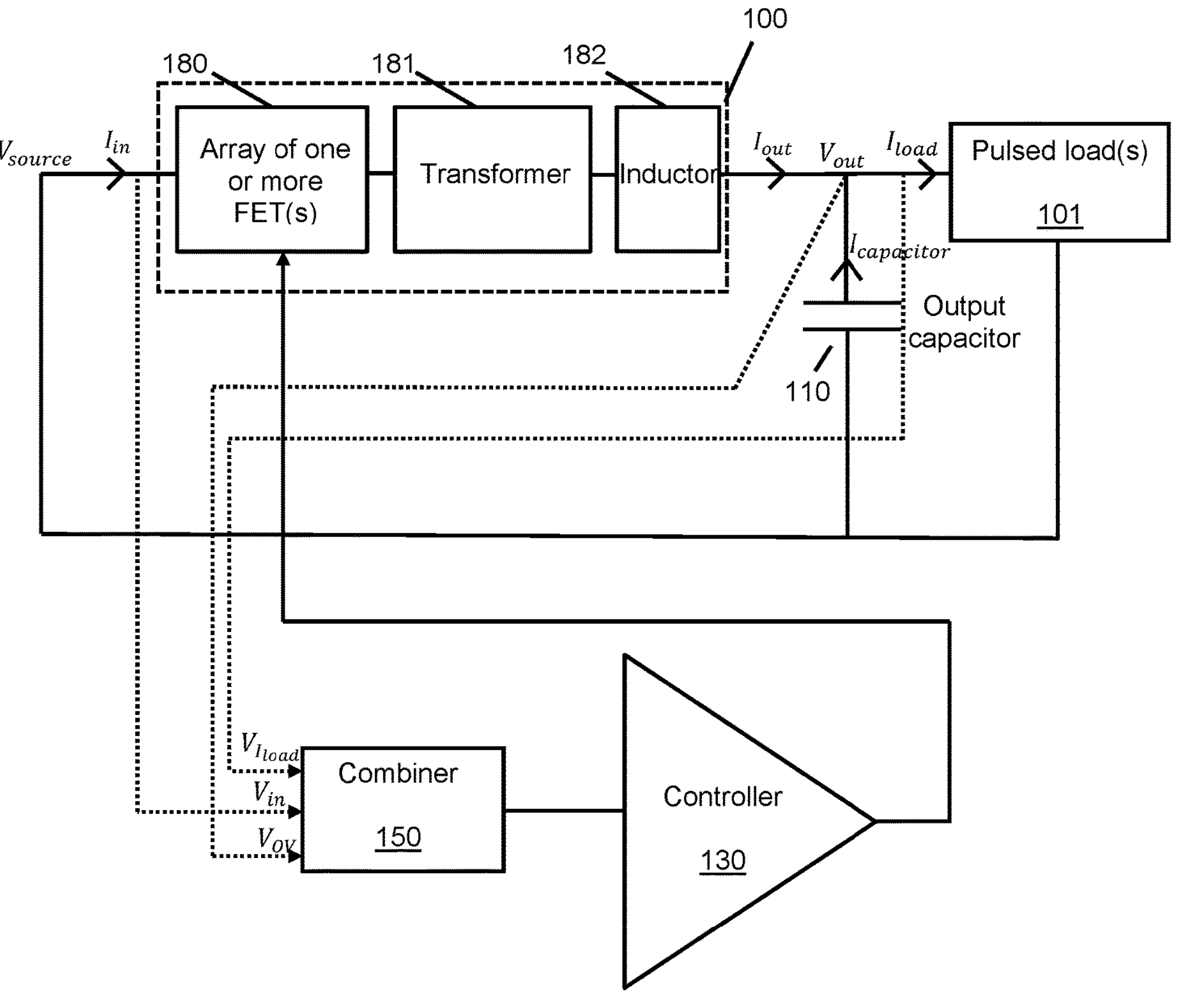
FIG. 1C illustrates an embodiment of the architecture of the system of FIG. 1A.

Attention is now drawn to FIG. 1C, which depicts an embodiment of the system of FIG. 1A.

In FIG. 1C, typical components of the power supply 100 are depicted. Note that the components of the power supply depicted in FIG. 1C are only examples. These components include an array 180 of one or more field-effect transistors (FET(s)), a transformer 181 and an inductor 182. Other components and/or additional components can be used as part of the power supply 100. In particular, components typically used in a Buck Converter or in a Boost Converter can be used.

The controller 130 is fed with a plurality of signals. As shown in FIG. 1C, a combiner 150 can perform operations on the plurality of signals. The output of the combiner 150 is fed to an input of the controller 130. Note that the combiner 150 can be part of the controller 130 or external to it.

Figure 2:
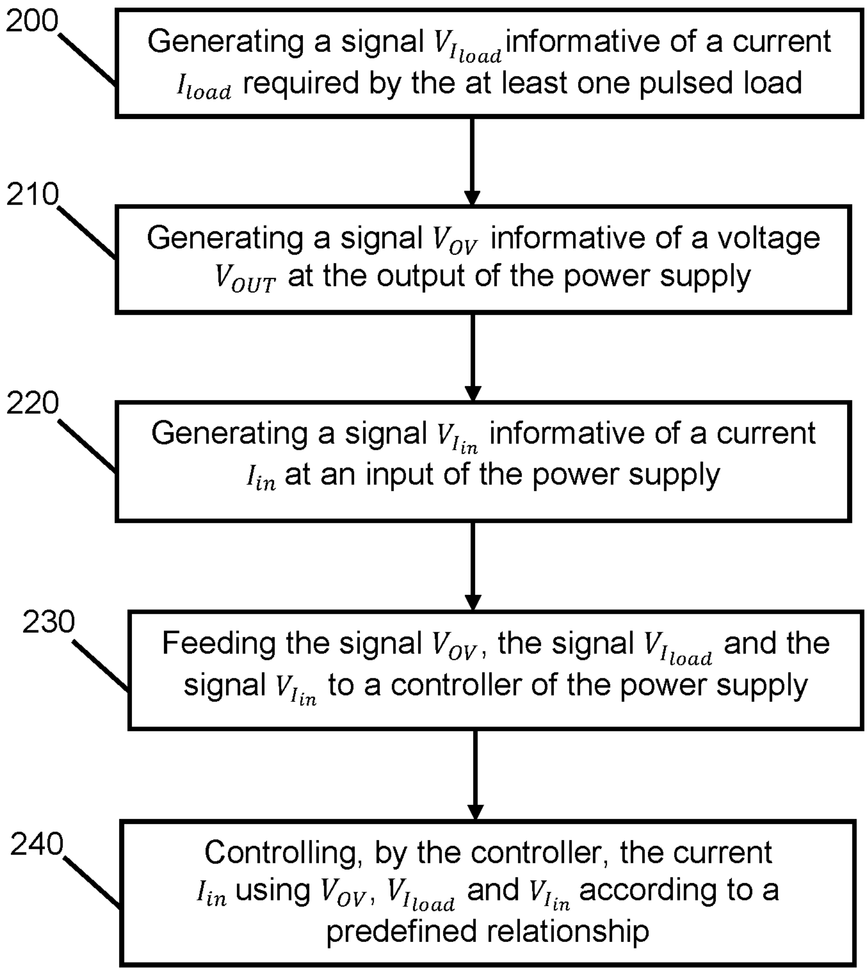
FIG. 2 illustrates an embodiment of a method of controlling a power supply to provide energy to a pulsed load.

Attention is now drawn to FIG. 2.

A signal (e.g., voltage signal), noted $V_{I_{load}}$, is generated (operation 200). $V_{I_{load}}$ is informative of the current $I_{load}$ required by the at least one pulsed load 101. In particular, $V_{I_{load}}$ can be computed such that its amplitude is representative of the average current required by the at least one pulsed load 101 (in other words, $V_{I_{load}}$ is informative of an average of $I_{load}$). The average current can be computed over a predetermined period of time, for example over one or more (repetitive) cycles, each cycle comprising a period of time including a peak of current intensity and a period of time in which the current intensity is substantially equal to zero (until the next peak of current intensity is reached).

Figure 3A:
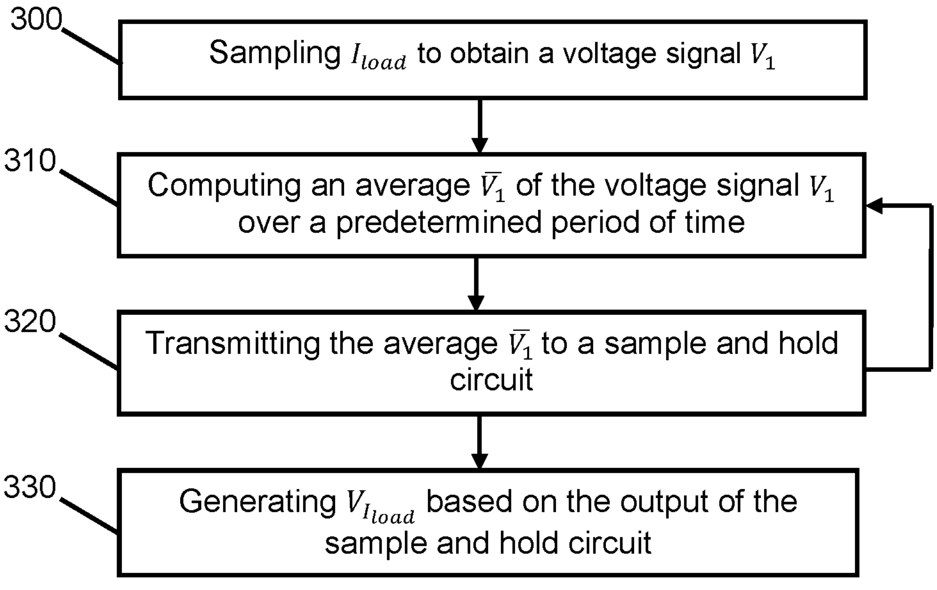
FIG. 3A illustrates an embodiment of a conversion of the current required by the pulsed load into a voltage signal informative thereof.
Figure 3B:
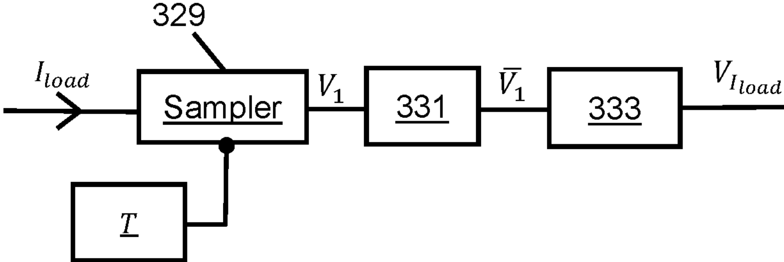
FIG. 3B illustrates an embodiment of an architecture enabling conversion of the current required by the pulsed load into a voltage signal informative thereof.

FIGS. 3A and 3B depict a method which can be used to generate $V_{I_{load}}$. The method includes sampling $I_{load}$ to obtain a voltage signal $V_1$. A sampler 329 can be used. The sampler 329 can include e.g., a current transformer, a resistance, etc. (this is not limitative).

The method further includes determining (operation 310) an average $\overline{V}_1$ of the voltage signal $V_1$ over a predetermined period of time T. In some embodiments, the predetermined period of time T can be set as corresponding to the highest PRI (Pulse Repetition Interval) of the pulsed load 101. Indeed, according to some embodiments, the operator of the pulsed load 101 can provide the highest PRI under which the pulsed load 101 is expected to operate. As a consequence, T can be selected as equal to this value, or can be selected as higher than this value by a factor of e.g. 10% (this value is not limitative).

The average $\overline{V}_1$ of $V_1$ can be determined using a standard module 331, which can include electrical components such as a resistor and a capacitor.

At the end of each period of time T, the average $\overline{V}_1$ is provided (operation 320) to a sample and hold circuit 333. The sample and hold circuit 333 acts as a "memory". The output of the sample and hold circuitry 333 can correspond to the signal $V_{I_{load}}$ (operation 330).

The module 331 repetitively calculates the average of the signal $V_1$ over the period of time T, which is then transmitted to the sample and hold circuit 333.

In the most demanding operating conditions of the pulsed load 101, the amplitude of each peak of current $I_{load}$ is maximal, the duration in time of each peak of current $I_{load}$ is maximal, and the duty cycle of $I_{load}$ is maximal. The most demanding operating conditions can correspond e.g., to a configuration in which the average current $I_{load}$ required by this pulsed load 101 is maximal. Note that the data defining the most demanding operating conditions of the pulsed load 101 constitute a known input and are generally provided by the operator of the pulsed load 101.

Assume for example that the most demanding operating conditions of operation (worst case scenario) of the pulsed load 101 correspond to the parameters provided hereinafter: each peak of current intensity $I_{load}$ is equal to 170 A, with a duration of 500 μs, the duty cycle is equal to 20%, and the PRI is equal to 2.5 msec (frequency of 400 Hz).

Figure 3C:
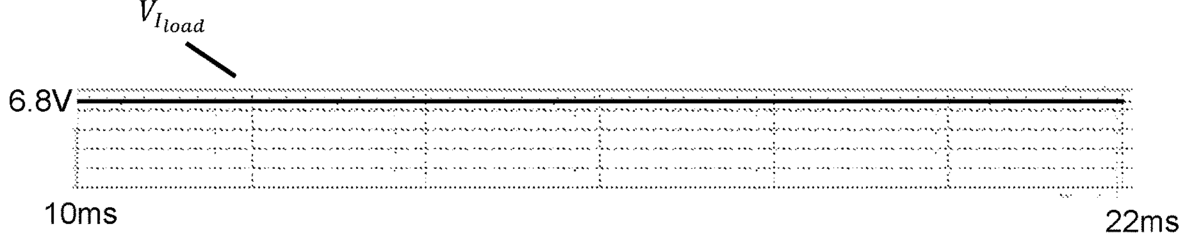
FIG. 3C illustrates a non-limitative example of the voltage signal informative of the current required by the pulsed load.
Figure 3D:
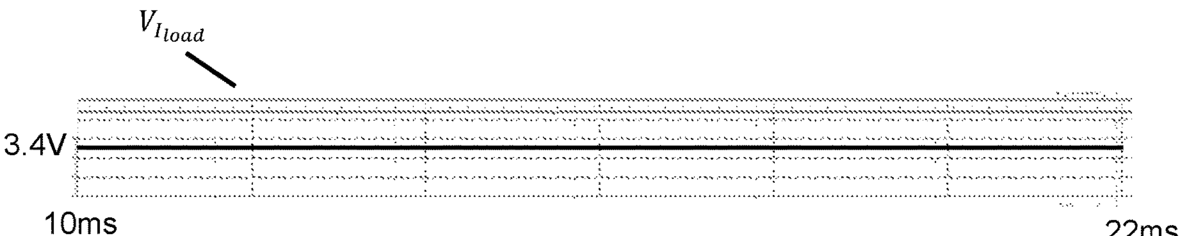
FIG. 3D illustrates another non-limitative example of the voltage signal informative of the current required by the pulsed load.

In this non-limitative example, under the most demanding operating conditions of operation, the voltage signal $V_{I_{load}}$ which is obtained is a constant voltage equal to 6.8V, as visible in FIG. 3C. This value is not limitative and depends on the parameters chosen for the components used in the module 331 and in the sample and hold circuitry 333. Note that the representation of FIG. 3C (and FIG. 3D) is schematic and does not depict the time response that can be required to compute the signal $V_{I_{load}}$. Note that the conversion of $I_{load}$ under the most demanding operations into a constant voltage $V_{I_{load}}$ equal to 6.8V is arbitrary, and another value can be selected.

Assume that the pulsed load 101 currently operates under given conditions of operations for $I_{load}$ (for example, the most demanding conditions of operation). As long as the pulsed load 101 does not deviate from these given conditions of operation, the value of $V_{I_{load}}$ remains the same.

When the pulsed load 101 deviates from the given conditions of operation, the voltage signal $V_{I_{load}}$ has a different value. For example, assume that the duty cycle of $I_{load}$ is reduced by a factor of 2, from 20% to 10%. As a consequence, the voltage signal $V_{I_{load}}$ is reduced by the same factor. For example (note that this example is not limitative), the voltage signal $V_{I_{load}}$ is now a constant voltage equal to 3.4V (see FIG. 3D). Similarly, if the amplitude of the peaks of $I_{load}$ is reduced from 170 A to 56 A (division by three) then the voltage signal $V_{I_{load}}$ is a constant voltage equal e.g. to 2.26V (division by three). In other words, a linear relationship can be generated between the signal $V_{I_{load}}$ and the current $I_{load}$.

Any change in the parameters defining $I_{load}$ will therefore induce a change in $V_{I_{load}}$.

Reverting to FIG. 2, the method includes operation 210, in which a signal $V_{OV}$ is generated. $V_{OV}$ is an electrical signal (e.g., a voltage signal) informative of the voltage $V_{OUT}$ at the output of the power supply 100 (that is to say, the voltage of the output capacitor 110—this is also the voltage at the input of the pulsed load 101).

According to some embodiments, it is desired to obtain a voltage $V_{OUT}$ which remains within an acceptable voltage range. Indeed, the pulsed load 101 generally requires a constant voltage value. The acceptable voltage range is provided e.g., by the operator of the pulsed load 101, and is a given input. The acceptable voltage range includes a minimal acceptable value $V_{OUT,min}$ and a maximal acceptable value $V_{OUT,max}$. For example, it is desired to have a voltage $V_{OUT}$ which varies around a main value (e.g., 50V) with a predefined tolerance of variation around this main value (e.g., ±2V). In this case, the acceptable voltage range for $V_{OUT}$ is [48V; 52V]. These values are not limitative.

The output capacitor 110 can be selected to meet the requirements of the pulsed load 101 under its most demanding operating conditions (which are, as mentioned above, known in advance): maximal allowed variation of the voltage $V_{OUT}$ (e.g. ±2V), under maximal pulse width of $I_{load}$, maximal amplitude of load current $I_{load}$ and maximal duty cycle.

For example, assume that the maximal amplitude of each peak of current $I_{load}$ is equal to 170 A, the maximal duration in time of each peak of current $I_{load}$ is 500 μs, and the maximal duty cycle of $I_{load}$ is 20%. This implies that the maximal average value of the current $I_{load}$ is 34 A.

As explained hereinafter, the power supply 100 is controlled to provide a DC current $I_{out}$ ($I_{out}$ is substantially constant according to a stability criterion) corresponding to the average of $I_{load}$, which, together with the current $I_{capacitor}$ generated by the output capacitor 110, enable to feed to the pulsed load 101 the required current $I_{load}$.

In order to provide a current which matches the maximal peak of current (in this non limitative example, 170 A) periodically requested by the pulsed load 101, the output capacitor 110 (previously charged using a current $I_{load}$ of 34 A) must provide a current $I_{capacitor}$ of 170 A−34 A=136 A. As known in the art, $$I_{capacitor} = C\frac{dV}{dt},$$

with C the capacitance of the capacitor and dV the voltage variation. We therefore obtain:

$$C = \frac{I_{capacitor}dt}{dV} = \frac{(136\text{ A})(500\ \mu\text{s})}{2\text{ V}} = 34\text{ mF}.$$

These values are not limitative. This corresponds to the minimal capacitance required for the output capacitor 110, determined in the most demanding operating conditions of the pulsed load 101. Note that this is not limitative, and a larger capacitance can be used for the output capacitor 110.

As visible in FIG. 4, the signal $V_{OUT}$ includes a repetitive sequence of two main temporal phases.

In a first phase 400 corresponding to a time period in which there is a peak in the current $I_{load}$, there is a drop in the amplitude of $V_{OUT}$ (in the non-limitative example of FIG. 4, a drop of around 2V is present). This is due to the fact that during a peak of current $I_{load}$, the output capacitor 110 generates a current $I_{capacitor}$ which induces a drop in the voltage $V_{OUT}$ of the output capacitor 110.

In a second phase 410 corresponding to a time period in which there is no peak in the signal $I_{load}$ (in this time period the current $I_{load}$ is substantially equal to zero), the signal $V_{OUT}$ increases (until a new peak appears in the current $I_{load}$, and at that time there is again a drop in $V_{OUT}$). In the example of FIG. 4, an increase of 2V is present.

In the example of FIG. 4, the signal $V_{OUT}$ remains in the acceptable voltage range ([48V; 52V] as defined e.g., by the operator of the pulsed load 101).

In order to ensure that the signal $V_{OUT}$ remains in the acceptable voltage range, the signal $V_{OV}$ can be used. As explained hereinafter, the signal $V_{OV}$ is also used to enable the controller 103 to command the power supply 100 to request/generate a substantially constant current $I_{in}$, in order to obtain a substantially constant output current $I_{out}$, which is substantially equal to the average of the current $I_{load}$ demanded by the pulsed load 101. This will be further described hereinafter.

As long as the signal $V_{OUT}$ remains in the acceptable voltage range, it is converted into a signal $V_{OV}$ which remains within a predefined voltage range [$V_{OV,1}$; $V_{OV,2}$]. $V_{OV,1}$ is generally selected as a small value, for example 0.5V. Note that this value is not limitative, and another value can be used.

In order to determine $V_{OV,2}$, the following computation can be performed.

As explained hereinafter, the controller 103 controls the power supply 100 using a predefined relationship (see Equation 2). Assume for example that the predefined relationship is (note that Equation 1 is an example of Equation 2):

$$V_{I_{in}}+V_{OV}-V_{I_{load}}=2*V_{ref} \quad \text{Equation 1}$$

$V_{ref}$ is a reference voltage of the controller 130. Assume for example that $V_{ref}$=1.25. As explained hereinafter, $V_{I_{in}}$ is an electrical signal (e.g., voltage signal) informative of the current $I_{in}$ at the input of the power supply 100.

$V_{OV,2}$ can be selected such that, for $V_{OUT}=V_{OUT,max}$ (for example 52V), $V_{I_{in}}=V_{I_{load}}$.

According to the relationship above, this implies that $V_{OV,2}=2*V_{ref}=2.5$V.

Once $V_{OV,1}$ and $V_{OV,2}$ have been selected, it can set that, for a value of $V_{OUT}$ which is equal to 50V (corresponding to the middle of the acceptable voltage range), the value of $V_{OV}$ is also located at the middle of the interval [$V_{OV,1}$; $V_{OV,2}$]. In the example provided above, a value of $V_{OUT}$ equal to 50V corresponds therefore to a value of $V_{OV}$ equal to 1.5V.

The conversion of $V_{OUT}$ from the interval [$V_{OUT,min}$; $V_{OUT,max}$] (e.g. [48V; 52V]) to the interval [$V_{OV,1}$; $V_{OV,2}$] (e.g. [0.5V; 2.5V]) can be performed using different methods.

In some embodiments, a FPGA can be used. In some embodiments, this conversion can be performed using e.g., a differential amplifier and a resistance.

In some embodiments, in order to prevent the signal $V_{OV}$ from having ripples as the signal $V_{OUT}$ (when it varies by ±2V), a capacitor can be used to determine an average of the signal $V_{OV}$.

Note that in some embodiments, the signal $V_{OV}$ is informative of an average of the value of $V_{OUT}$. When the average of $V_{OUT}$ is equal to $V_{OUT,max}$, then $V_{OV}$ is set equal to $V_{OV,2}$, when the average of $V_{OUT}$ is equal to $V_{OUT,min}$, then $V_{OV}$ is set equal to $V_{OV,1}$, and when the average of $V_{OUT}$ is equal to $$\frac{V_{OUT,min}+V_{OUT,max}}{2}$$

then $V_{OV}$ is set equal to $$\frac{V_{OV,1}+V_{OV,2}}{2}.$$

According to some embodiments, when the signal $V_{OUT}$ is higher than the maximal acceptable value $V_{OUT,max}$ (for example the signal $V_{OUT}$ is larger 52V), the signal $V_{OV}$ is set (see operation 610) as equal to a new value $V_{OV,max}$, which is (much) larger than $V_{OV,2}$.

As explained hereinafter with reference to Equation 3 (which describes the operation performed by the controller 130 in coordination with the combiner 150), this enables the controller to reduce $I_{in}$, and in turn, to bring back $V_{OUT}$ to the acceptable voltage range.

This can be performed by using e.g., a diode. As long as the signal $V_{OUT}$ is within the acceptable voltage range, the diode does not operate. When the signal $V_{OUT}$ is higher than 52V, this diode starts to operate (and can induce charging of a capacitor, and therefore, induces an increase of $V_{OV}$). This induces the signal $V_{OV}$ to reach the value of $V_{OV,max}$. Note that $V_{OV,max}$ can be selected using Equation 3, such that, even under the highest load required by the pulsed load 101 (in which $V_{I_{load}}$=6.8V), the voltage $V_{I_{in}}$ (and therefore the current $I_{in}$) is set to zero. Intuitively, this means that the power supply 100 should stop providing current to the pulsed load 101 in case the signal $V_{OUT}$ is very high.

In the example of Equation 1, this yields the following equation (for $V_{I_{in}}=0$ and $V_{I_{load}}=6.8V$).

$$V_{OV,max}=2.5+6.8=9.3V$$

In some embodiments, when the signal $V_{OUT}$ is lower than 48V (meaning that the signal $V_{OUT}$ is smaller than the minimal acceptable value $V_{OUT,min}$), the signal $V_{OV}$ can be set equal to a new smaller value $V_{OV,min}$ (see operation 620), which is smaller than $V_{OV,1}$. For example, $V_{OV,min}$ is equal to 0V. This can be performed by using e.g., a comparator. Intuitively, this means that the power supply 100 should provide maximal current to the pulsed load 101 in case the signal $V_{OUT}$ is very small.

In the example of FIG. 4, since the average of the signal $V_{OUT}$ is in the middle of the acceptable voltage range (50V), the signal $V_{OV}$ depicted in FIG. 5 is substantially equal to 1.5V.

As shown in FIG. 2, another signal, hereinafter noted $V_{I_{in}}$ (operation 220), is generated. $V_{I_{in}}$ is an electrical signal (e.g. voltage signal) informative of the current $I_{in}$ at the input of the power supply 100.

Figure 7:
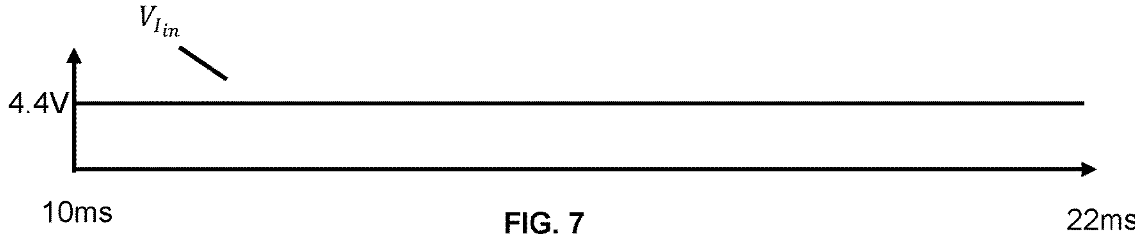
FIG. 7 illustrates a non-limitative example of a voltage signal informative of the current at the input of the power supply.

FIG. 7 illustrates an example of the signal $V_{I_{in}}$.

A possible embodiment of a conversion of the current $I_{in}$ into the signal $V_{I_{in}}$ is described with reference to FIG. 9.

The method of FIG. 2 further comprises feeding (operation 230) the signal $V_{OV}$, the signal $V_{I_{load}}$ and the signal $V_{I_{in}}$ to the controller 130 of the power supply 100.

Based on these signals, the controller 130 controls the current $I_{in}$ fed to the power supply 100. In particular, the controller 130 can control opening of one or more field-effect transistors (FET) of the power supply 100 to control the value of $I_{in}$. Note that this is not limitative and, in some embodiments, a phase shift controller or another adapted topology can be used.

The controller 130 controls the current $I_{in}$ such that the signal $V_{I_{in}}$ which is informative thereof, meets a predefined relationship with the signals $V_{OV}$ and $V_{I_{load}}$ (see e.g., Equation 3 recited hereinafter). As shown in FIGS. 1A and 1C, a closed loop control is implemented, in which the controller 130 receives as an input the signal $V_{I_{in}}$ informative of the current $I_{in}$, and controls the current $I_{in}$.

Assume that the pulsed load 101 requests a series of current peaks with the same amplitude over a given period of time. After a transition time enabling the current $I_{in}$ to reach the required value, the controller 130 enables the power supply 100 to request a current $I_{in}$ for which the predefined relationship is met. Once the predefined relationship is met, the current $I_{in}$ is a DC current. Since the power supply 100 receives a DC current $I_{in}$, it generates at its output a current $I_{out}$ which is a DC current. Note that due to various factors (noise, etc.), even after a period of stabilization, the amplitude of $I_{in}$ can vary slightly. According to some embodiments, the amplitude of $I_{in}$ is constant according to a stability criterion over at least part of the given period of time. The stability criterion can define the maximal peak-to-peak variation which is acceptable for $I_{in}$. In some embodiments, the stability criterion defines that the variations in the amplitude of $I_{in}$ are smaller than or equal to 5% or 10% of the average of $I_{in}$, when the system is not in a transition period. For example, the peak-to-peak variation is smaller than 400 mA (this is not limitative).

Similarly, even after a period of stabilization, the amplitude of $I_{out}$ can vary slightly. According to some embodiments, the amplitude of $I_{out}$ is constant according to a stability criterion over at least part of the given period of time. The stability criterion can define the maximal peak-to-peak variation which is acceptable for $I_{out}$. According to some embodiments, the stability criterion defines that the variations in the amplitude of $I_{out}$ are smaller than or equal to 0.2. $\overline{I_{out}}$, when the system is not in a transition period ($\overline{I_{out}}$ is the average value of $I_{out}$). For example, the peak-to-peak variation is smaller than 400 mA (this is not limitative).

The predefined relationship is calibrated to ensure that the DC current $I_{in}$ has a value which induces generation of a current $I_{out}$ at the output of the power supply 100 which matches an average of $I_{load}$ according to a matching criterion over at least part of the given period of time.

The matching criterion can define the maximal acceptable error between $I_{out}$ and the average of $I_{load}$ (e.g., 5%—this is not limitative).

For example, assume that current $I_{load}$ includes peaks of 170 A with a duty cycle of 20% over a given period of time. The average value of the current $I_{load}$ is equal to 34 A (the most demanding conditions of operation of the pulsed load 101, as explained above). Therefore, the controller 103 needs to control the power supply 100 to request a current $I_{in}$, which induces generation of an output current $I_{out}$ equal to 34 A. The relationship between $I_{in}$ and $I_{out}$ can be defined as follows (this is not limitative):

$$V_{out}I_{out}=\varepsilon V_{source}I_{in}$$

ε is the efficiency of the power supply 100 which is known or can be estimated.

During a period of time (see reference 410 in FIG. 4) in which the pulsed load 101 does not require a peak of current ($I_{load}$ is equal to zero, or close to zero), the output current $I_{out}$ charges the output capacitor 110 (this occurs automatically since the pulsed load 101 does not require current in this period of time 410).

Figure 8:
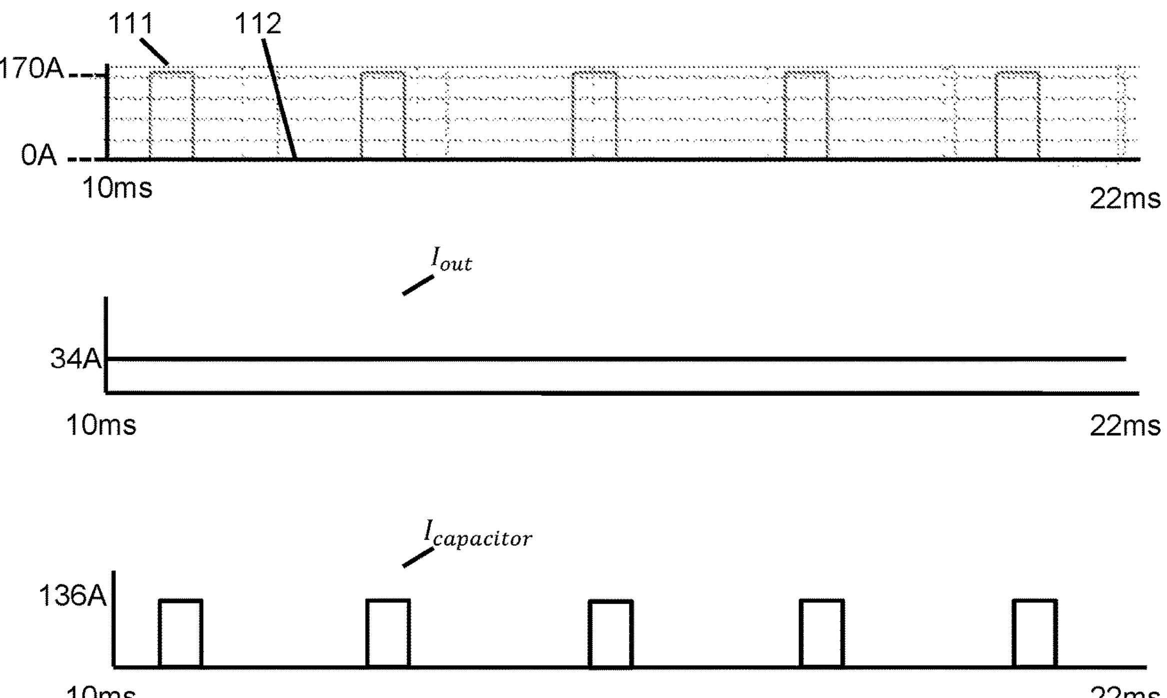
FIG. 8 illustrates a non-limitative example of the current required by the pulsed load, of the DC current generated by the power supply and of the current generated by the output capacitor.

During a period of time (see reference 400 in FIG. 4) in which the pulsed load 101 requires a peak of current ($I_{load}$ is equal to its maximal value), the output current $I_{out}$ is fed to the pulsed load 101. In addition, since the output capacitor 110 has been previously charged (as explained above), the output capacitor 110 generates an output current $I_{capacitor}$. The sum of $I_{out}$ and $I_{capacitor}$ matches an amplitude of the pulse of current required by the pulsed load during a peak (according to a matching criterion defining the maximal acceptable error, e.g., 5%, this value being not limitative). In the example mentioned above, in which peaks of 170 A are required by the pulsed load 101 with a duty cycle of 20%, the value of $I_{capacitor}$ is 136 A. This is illustrated in FIG. 8, in which peaks of the current of 136 A are depicted for $I_{capacitor}$. Note that FIG. 8 is schematic and does not represent noise or delays which can be caused by the time response of the system.

Figure 9:
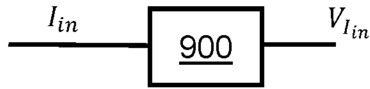
FIG. 9 illustrates an embodiment of a conversion of the current at the input of the power supply into a voltage signal informative thereof.

Attention is drawn to FIG. 9.

As explained above, the controller 130 controls $I_{in}$ such that the signal $V_{I_{in}}$ which is informative thereof, meets a predefined relationship with the signals $V_{OV}$ and $V_{I_{load}}$. Assume that in this example, the predefined relationship is $V_{I_{in}}+V_{OV}-V_{I_{load}}=2.\ V_{ref}$.

When the pulsed load 101 operates in its most demanding operating conditions for the current $I_{load}$ (in the non-limitative example used above, this corresponds to a configuration in which each peak of current intensity $I_{load}$ is equal to 170 A with a duration of 500 μs, the duty cycle is 20%, and the voltage $V_{OUT}$ varies between 48V and 52V), we have $V_{OV}=1.5V$ and $V_{I_{load}}=6.8V$. As explained hereinafter, $V_{ref}$ is a given parameter of the controller 130 (reference voltage) equal e.g., to 1.25V. As a consequence, in order to meet the predefined relationship when the pulsed load 101 operates in its most demanding operating conditions, the signal $V_{I_{in}}$ must be equal to 7.8V ($V_{I_{in}}$=2.5+6.8−1.5=7.8V).

The relationship between $I_{in}$ and $I_{out}$ can be defined as follows (this is not limitative):

$$V_{out}I_{out}=\varepsilon V_{source}I_{in}$$

ε is the efficiency of the power supply 100 which is known or can be estimated (for example, ε=0.94).

In the most demanding operating conditions for the current of the pulsed load, we therefore obtain:

$$I_{in} = \frac{V_{out}I_{out}}{\varepsilon V_{source}} = \frac{50*34}{0.94*320} = 5.65\ \text{A}$$

Therefore, in the most demanding operating conditions for the current of the pulsed load, the value of $V_{I_{in}}$ (7.8V) must represent a current $I_{in}$ of 5.65 A.

In the architecture of FIG. 9, the current $I_{in}$ is fed to a current sensor 900. The parameters of the current sensor 900 are selected to ensure that for an input current $I_{in}$ of 5.65 A, a voltage $V_{I_{in}}$ of 7.8V is generated.

In some embodiments, the current $I_{in}$ is fed to a current sensor which divides the current by a known constant factor, and the output is multiplied by a fixed gain G (to be determined), in order to obtain $V_{I_{in}}$. The gain G is therefore determined such that, for an input current $I_{in}$ of 5.65 A, the value of $V_{I_{in}}$ is equal to 7.8V.

Note that there is a linear relationship between $I_{in}$ and $V_{I_{in}}$.

Figure 10:
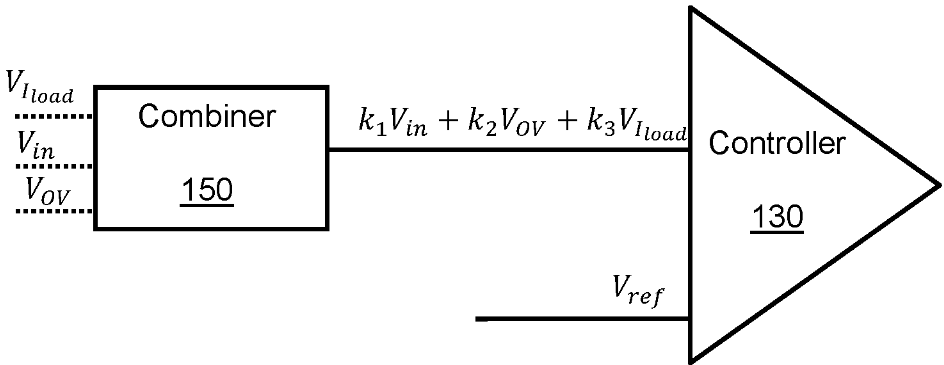
FIG. 10 illustrates an embodiment of a combination of various signals before their feeding to the controller of the power supply.

Attention is now drawn to FIG. 10.

As mentioned above, the controller 130 controls $I_{in}$, in order to ensure that a predefined relationship is met between $V_{I_{in}}$, $V_{OV}$ and $V_{I_{load}}$.

According to some embodiments, the predefined relationship is defined as follows:

$$k_1V_{I_{in}}+k_2V_{OV}-k_3V_{I_{load}}=V_{ref} \quad \text{Equation 3}$$

In this relationship, $k_1$, $k_2$, and $k_3$ are positive parameters. In a non-limitative example, $k_1=k_2=k_3=½$. $V_{ref}$ is a reference voltage of the controller 130 (this is a given parameter of the parameter—each controller 130 having his own reference voltage).

The relationship provided above is not limitative.

The controller 130 tries to modify $V_{I_{in}}$ (by modifying $I_{in}$ taken by the power supply 100 from the power source 120) in order to have the relationship which is met. Note that $V_{OV}$ and $V_{I_{load}}$ are measured, and $V_{ref}$ is a predefined constant of the controller 130. The generation of the signals $V_{OV}$, $V_{I_{load}}$ and $V_{I_{in}}$ has been described above.

Assume that the predefined relationship is met, and that the load (current) taken by the pulsed load 101 is decreased. For example, the amplitude of the pulses of $I_{load}$ is decreased, and/or the duty cycle of the pulses of $I_{load}$ is decreased and/or the width of each pulse of the current $I_{load}$ is decreased, etc.

As a consequence, the output capacitor 110 will be less discharged during a pulse of current taken by the pulsed load 101 (since there is a linear relationship between the current and the voltage in a capacitor). For example, if the output capacitor 110 formerly discharged from 52V to 48V during a pulse of $I_{load}$, it is now discharged from 52V to 50V.

Therefore, the variations in the voltage $V_{OUT}$ at the output capacitor 110 will have a smaller amplitude (e.g., with an amplitude smaller than 2V). The average of the voltage $V_{OUT}$ is increased. The value of the signal $V_{OV}$ will therefore increase. In some cases, the value of $V_{OUT}$ may reach a value which is above the maximal acceptable value $V_{OUT,max}$.

Since $V_{ref}$ is fixed, in order to maintain the relationship of Equation 3 as true, the controller 130 needs to decrease also the amplitude $V_{I_{in}}$, by decreasing $I_{in}$. Since $I_{in}$ is decreased, $I_{out}$ at the output of the power supply 100 is decreased, thereby complying with the decrease in $I_{load}$. When the predefined relationship is met, the power supply 100 generates, at its output, a current $I_{out}$ which is equal (or substantially equal) to the new average value of $I_{load}$. Indeed, the predefined relationship has been defined for the most demanding conditions of operation, and, in view of its linearity, adapts to other conditions of operation of the pulsed load 101.

Similarly, assume that the predefined relationship is met, and that the load (current) taken by the pulsed load 101 is increased. For example, the amplitude of the pulses of $I_{load}$ is increased, and/or the duty cycle of the pulses of $I_{load}$ is increased, and/or the width of each pulse of the current $I_{load}$ is decreased, etc.

As a consequence, the output capacitor 110 will be more discharged during a pulse of current taken by the pulsed load 101 (since there is a linear relationship between the current and the voltage in a capacitor). For example, if the output capacitor 110 used to be discharged from 52V to 48V during a pulse of $I_{load}$, it is now discharged from 52V to 46V.

Therefore, the average value of the voltage $V_{OUT}$ at the output capacitor 110 is decreased. In some cases, the value of $V_{OUT}$ may reach a value which is below the minimal acceptable value $V_{OUT,min}$. The value of the signal $V_{OV}$ will therefore decrease. Since $V_{ref}$ is fixed, in order to maintain the relationship of Equation 3 as true, the controller 130 needs to increase also the amplitude $V_{I_{in}}$, by increasing $I_{in}$. Since $I_{in}$ is increased, $I_{out}$ at the output of the power supply 100 is increased, thereby complying with the increase in $I_{load}$. When the predefined relationship is met, the power supply 100 generates, at its output, a current $I_{out}$ which is equal (or substantially equal) to the new average value of $I_{load}$.

Figure 11:
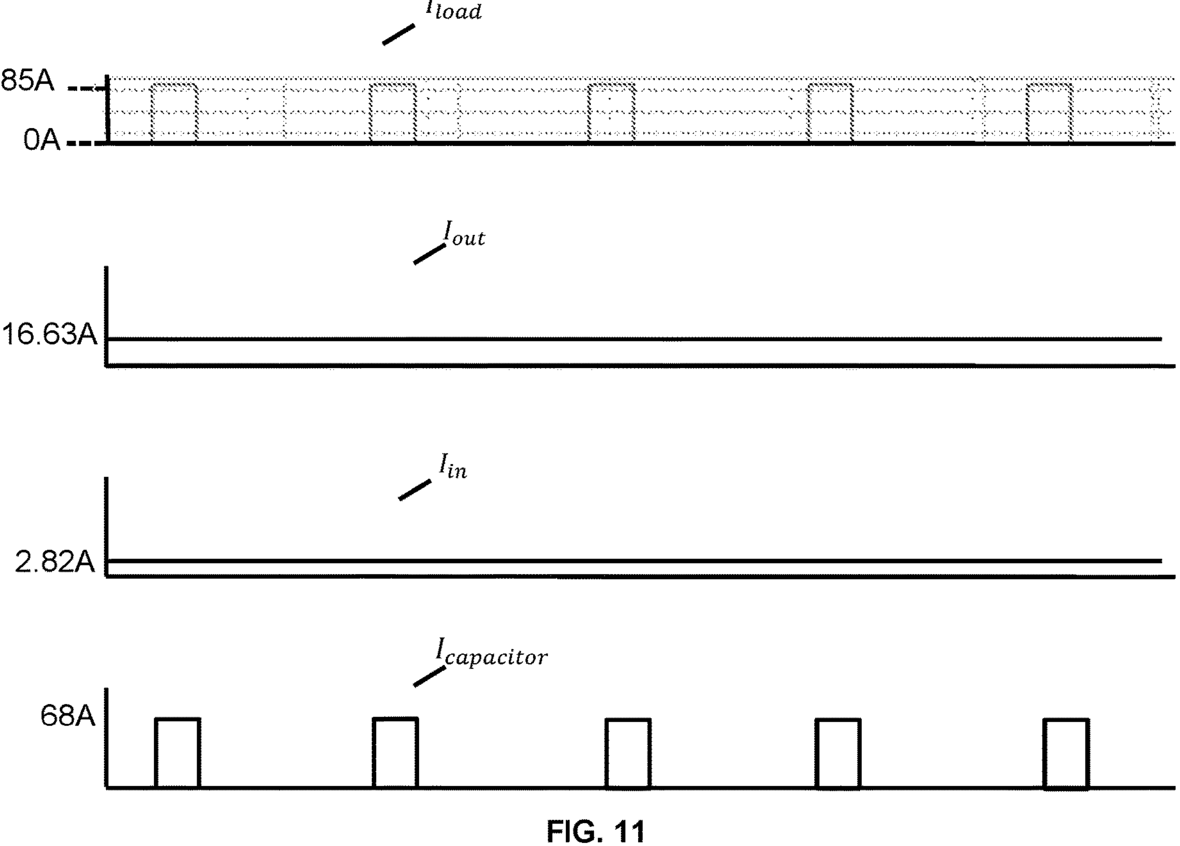
FIG. 11 illustrates a non-limitative example of the current required by the pulsed load, of the DC current generated by the power supply, of the DC current at the input of the power supply, and of the current generated by the output capacitor.

A non-limitative example is provided with reference to FIG. 11.

Assume that the current $I_{load}$ previously included peaks of 170 A, which have now been reduced to 85 A. The duty cycle remains equal to 20%. This corresponds to an average current $I_{load}$ of 17A. The other parameters of the pulsed load 101 remain the same. As a consequence, $V_{I_{load}}$ decreases from 6.8V to 3.4V. The output capacitor 110 is less discharged, and its average voltage $V_{OUT}$ increases to around 51V (with variations of ±1V around the average value 51V). Therefore, the signal $V_{OV}$ also increases. According to Equation 3, this induces the controller 130 to decrease $I_{in}$ until the relationship is met (the process is iterative until the relationship is met). In particular, the value of $V_{I_{in}}$ decreases from its original value 7.8V to a new value 3.9V. This corresponds to a value of $I_{in}$=2.82 A, which enables to generate an output current $$I_{out} = \frac{\varepsilon V_{source}I_{in}}{V_{out}} = \frac{0.94*320*2.82}{51} = 16.63\ \text{A},$$

which matches substantially the average value (17 A) of the current $I_{load}$, as requested.

$I_{out}$ charges the output capacitor 110 during the periods of time in which there is no peak of current. When the pulsed load 101 requires a peak of current, the output capacitor 110 provides peaks of current of around $I_{capacitor}$=68 A (since the output capacitor 110 is charged with a current which is divided by two with respect to the most demanding operating conditions of the pulsed load 101, in which $I_{out}$=34 A and $I_{capacitor}$=136 A).

Assume now that the current $I_{load}$ previously included peaks of 85A, which have now been increased to 100 A (average of $I_{load}$ is therefore 20 A). The other parameters of the pulsed load 101 remain the same. As a consequence, $V_{I_{load}}$ increases from 3.4V to around 4V. The output capacitor 110 is more discharged, and its average voltage $V_{OUT}$ decreases to around 50V (with variations of ±2V around the average value 50V) The signal $V_{OV}$ decreases such that $V_{I_{in}}$ reaches its new value.

The controller 130 increases $I_{in}$ until the relationship is met, which means that value of $V_{I_{in}}$ increases from its previous value 3.9V to a new value 4.56V.

This corresponds to a value of $I_{in}$=3.30 A, which generates an output current $$I_{out} = \frac{\varepsilon V_{source} I_{in}}{V_{out}} = \frac{0.94 * 320 * 3.30}{50} = 19.8 \text{ A},$$

which matches substantially the average value (20 A) of the current $I_{load}$, as requested.

$I_{out}$ charges the output capacitor 110 during the periods of time in which there is no peak of current. When the pulsed load 101 requires a peak of current, the output capacitor 110 provides peaks of current of around $I_{capacitor}$=80 A.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system comprising a controller operative to control a power supply which has an output electrically coupled to at least one pulsed load and to an output capacitor, wherein the controller is operative to:

obtain a signal ($V_{OV}$) informative of a voltage ($V_{OUT}$) at the output of the power supply, obtain a signal ($V_{I_{load}}$) informative of a current ($I_{load}$) required by the at least one pulsed load, wherein, for at least one given period of time, the current ($I_{load}$) comprises a series of pulses, obtain a signal ($V_{I_{in}}$) informative of a current ($I_{in}$) at an input of the power supply, and control the current ($I_{in}$) such that the signal ($V_{I_{in}}$) which is informative thereof, meets a predefined relationship with the signals ($V_{OV}$) and ($V_{I_{load}}$), wherein said control enables the power supply to generate, at its output, a current ($I_{out}$) in at least part of the at least one given period of time, said at least part of the at least one given period of time comprising a plurality of pulses of the series of pulses, wherein the current ($I_{out}$), which is usable at least intermittently to charge the output capacitor is constant according to a stability criterion over the at least part of the at least one given period of time.

2. The system of claim 1, wherein the amplitude of ($I_{in}$) is constant according to a stability criterion over the at least part of the at least one given period of time.

3. The system of claim 1, wherein said control of the current ($I_{in}$) by the controller according to said predefined relationship induces the power supply to generate, at its output, the current ($I_{out}$) which matches an average of ($I_{load}$) according to a matching criterion over the at least part of the at least one given period of time.

4. The system of claim 1, wherein the current ($I_{out}$) is constant according to a stability criterion over in said at least part of the at least one given period of time.

5. The system of claim 1, wherein the voltage ($V_{OUT}$) is associated with an acceptable voltage range comprising a minimal acceptable value ($V_{OUT}$,min) and a maximal acceptable value ($V_{OUT,max}$), wherein the signal ($V_{OV}$) is informative of whether the voltage ($V_{OUT}$) is within the acceptable voltage range.

6. The system of claim 5, wherein, when the voltage ($V_{OUT}$) is within the acceptable voltage range, the signal ($V_{OV}$) remains within a different voltage range between a first value ($V_{OV,1}$) and a second value ($V_{OV,2}$).

7. The system of claim 5, wherein the second value ($V_{OV,2}$) is determined for a maximal average current ($I_{load}$) required by the pulsed load during given conditions of operation, such that, according to said predefined relationship, ($V_{I_{in}}$)=($V_{I_{load}}$).

8. The system of claim 5, wherein, when the voltage ($V_{OUT}$) is above the maximal acceptable value ($V_{OUT,max}$), the signal ($V_{OV}$) is set equal to a first maximal value ($V_{OV,max}$), larger than ($V_{OV,2}$).

9. The system of claim 1, comprising said output capacitor electrically coupled to the output of the power supply, wherein when an average value of the current ($I_{load}$) is increased, an amplitude of discharge of the output capacitor during a pulse of ($I_{load}$) is increased, and the signal ($V_{OV}$) is decreased.

10. The system of claim 1, comprising said output capacitor electrically coupled to the output of the power supply, wherein when an average value of the current ($I_{load}$) is decreased, an amplitude of discharge of the output capacitor during a pulse of ($I_{load}$) is decreased, and the signal ($V_{OV}$) is increased.

11. The system of claim 1, further comprising said output capacitor, wherein during periods of the at least one given period of time in which ($I_{load}$) does not comprise pulses, the current ($I_{out}$) provided by the power supply enables charging of the output capacitor.

12. The system of claim 1, wherein during periods of the at least one given period of time in which ($I_{load}$) comprises pulses, the current ($I_{out}$) is fed to the pulsed load but not to the output capacitor.

13. The system of claim 1, comprising said output capacitor electrically coupled to the output of the power supply, wherein, during at least one period of the given period of time in which a pulse of current ($I_{load}$) is required by the pulsed load, the power supply is operative to generate the current ($I_{out}$) and the output capacitor is operative to generate a current ($I_{capacitor}$), wherein the sum of ($I_{out}$) and ($I_{capacitor}$) matches an amplitude of the pulse of current ($I_{load}$) required by the pulsed load according to a matching criterion.

14. The system of claim 1, wherein an input voltage provided to the power supply is down-converted only once before it is fed, at the output of the power supply, to the pulsed load.

15. The system of claim 1, wherein, according to the predefined relationship, at least one of (i), (ii), (iii) or (iv) is met:

(i) the controller is operative to induce a decrease of an amplitude of ($I_{in}$) when an amplitude of ($V_{OV}$) increases;

(ii) the controller is operative to induce an increase of an amplitude of ($I_{in}$) when an amplitude of ($V_{OV}$) decreases;

(iii) the controller is operative to induce an increase of an amplitude of ($I_{in}$) when an amplitude of ($V_{I_{load}}$) increases; or (iv) the controller is operative to induce a decrease of an amplitude of ($I_{in}$) when an amplitude of ($V_{I_{load}}$) decreases.

16. The system of claim 1, wherein the controller is operative to control ($I_{in}$) using the predefined relationship:

$$k_1 V_{I_{in}} + k_2 V_{OV} - k_3 V_{I_{load}} = V_{ref}$$

wherein ($k_1$), ($k_2$), and ($k_3$) are positive parameters, and ($V_{ref}$) is a reference voltage of the controller.

17. The system of claim 1, further comprising at least one of the power supply or the pulsed load.

18. A method comprising, for a power supply which has an output electrically coupled to at least one pulsed load and to an output capacitor:

generating a signal ($V_{OV}$) informative of a voltage ($V_{OUT}$) at the output of the power supply, generating a signal ($V_{I_{load}}$) informative of a current ($I_{load}$) required by the at least one pulsed load, wherein, for at least one given period of time, the current ($I_{load}$) comprises a series of pulses, generating a signal ($V_{I_{in}}$) informative of a current ($I_{in}$) at an input of the power supply, feeding the signal ($V_{OV}$), the signal ($V_{I_{load}}$) and the signal ($V_{I_{in}}$) to a controller of the power supply, and controlling, by the controller, the current ($I_{in}$) such that the signal ($V_{I_{in}}$) which is informative thereof, meets a predefined relationship with the signals ($V_{OV}$) and ($V_{I_{load}}$), wherein said controlling enables the power supply to generate, at its output, a current ($I_{out}$) in at least part of the at least one given period of time, said at least part of the at least one given period of time comprising a plurality of pulses of the series of pulses, wherein the current ($I_{out}$), which is used to charge at least intermittently the output capacitor, Lout is constant according to a stability criterion over the at least part of the at least one given period of time.

19. The method of claim 18, wherein the amplitude of $I_{in}$ is constant according to a stability criterion over the at least part of the at least one given period of time.

20. The method of claim 18, wherein said controlling of the current ($I_{in}$) by the controller according to the predefined relationship induces the power supply to generate, at its output, the current $I_{out}$ which matches an average of ($I_{load}$) according to a matching criterion over the at least part of the at least one given period of time.

* * * * *